United States Patent
Barnes (10) Patent No.: US 12,464,830 B2
(45) Date of Patent: Nov. 4, 2025

(54) SOLAR PANEL SYSTEM

(71) Applicant: Taka Solar Corporation, Mountain View, CA (US)

(72) Inventor: Christopher Dwight Barnes, Mountain View, CA (US)

(73) Assignee: Taka Solar Corporation, Mountain View, CA (US)

(*) Notice: Subject to any disclaimer, the term of this patent is extended or adjusted under 35 U.S.C. 154(b) by 0 days.

(21) Appl. No.: 18/591,939

(22) Filed: Feb. 29, 2024

(65) Prior Publication Data

US 2024/0274736 A1  Aug. 15, 2024

Related U.S. Application Data (63) Continuation-in-part of application No. 18/237,857, filed on Aug. 24, 2023, which is a continuation of application No. 17/959,169, filed on Oct. 3, 2022, now Pat. No. 11,776,764, which is a continuation of application No. 17/357,390, filed on Jun. 24, 2021, now Pat. No. 11,495,414, application No. 18/591,939, filed on Feb. 29, 2024 is a continuation of application No. 15/362,836, filed on Nov. 29, 2016, now abandoned.

(60) Provisional application No. 63/061,728, filed on Aug. 5, 2020, provisional application No. 63/044,967, filed on Jun. 26, 2020.

(51) Int. Cl.
 *H10F 19/80* (2025.01)
 *H02S 30/10* (2014.01)
 *H02S 40/22* (2014.01)
 *H10F 10/14* (2025.01)
 *H10F 19/00* (2025.01)

(52) U.S. Cl.
 CPC ............ *H10F 19/807* (2025.01); *H02S 30/10* (2014.12); *H02S 40/22* (2014.12); *H10F 19/00* (2025.01); *H10F 19/80* (2025.01); *H10F 10/148* (2025.01); *Y02E 10/50* (2013.01); *Y02P 70/50* (2015.11)

(58) Field of Classification Search
 CPC ........ H10F 10/148; H10F 19/00; H10F 19/80; H10F 19/807; H10F 77/484; H10F 77/488; H02S 30/10; H02S 40/22
 See application file for complete search history.

(56) References Cited

U.S. PATENT DOCUMENTS

6,034,323 A * 3/2000 Yamada .................. H02S 20/23
                                                    136/251
10,920,482 B2 * 2/2021 Umeda .................. H10F 77/42
(Continued)

*Primary Examiner* — Golam Mowla
(74) *Attorney, Agent, or Firm* — Run8 Patent Group, LLC; Peter Miller (57) ABSTRACT

The present invention relates to a solar panel system, particularly a novel solar panel design to increase performance in a cost-effective manner. The present invention includes a solar panel assembly. The solar panel assembly includes a plurality of elongated solar electric module which includes a first transparent material and a second transparent material. In addition, a solar electric material is disposed between the first transparent material and the second transparent material. The solar electric module may include an elongated array of one or more solar electric cells. Additionally, each array of the one or more solar electric cells include at least one bi-facial solar cell.

19 Claims, 8 Drawing Sheets

(56) References Cited

U.S. PATENT DOCUMENTS

| | | | |
|---|---|---|---|
| 2007/0079864 A1* | 4/2007 | Gronet | H10F 77/935 |
| | | | 136/244 |
| 2007/0157964 A1* | 7/2007 | Gronet | H10F 77/147 |
| | | | 257/E31.038 |
| 2010/0018568 A1* | 1/2010 | Nakata | H10F 19/902 |
| | | | 136/246 |
| 2011/0232721 A1* | 9/2011 | Raymond | H10F 77/42 |
| | | | 136/246 |
| 2012/0097213 A1* | 4/2012 | Weidner | H10F 19/807 |
| | | | 136/246 |
| 2012/0103387 A1* | 5/2012 | Fischer | H10F 19/85 |
| | | | 257/E51.012 |
| 2014/0034114 A1* | 2/2014 | Wares | H10F 77/00 |
| | | | 136/251 |
| 2015/0243446 A1* | 8/2015 | Goldstein | H01G 9/2077 |
| | | | 136/256 |
| 2016/0013329 A1* | 1/2016 | Brophy | C09D 5/24 |
| | | | 136/256 |
| 2018/0019358 A1* | 1/2018 | Ahn | H10F 77/311 |
| 2022/0181509 A1* | 6/2022 | Hahn | H10F 77/48 |

* cited by examiner

SOLAR PANEL SYSTEM

CROSS-REFERENCE TO RELATED APPLICATIONS

This Application is a continuation of U.S. Non-Provisional application Ser. No. 15/362,836, filed on 29 Nov. 2016, which is hereby incorporated in its entirety by this reference.

This Application is a continuation-in-part of U.S. Non-Provisional application Ser. No. 18/237,857, filed on 24 Aug. 2023, which is a continuation of U.S. Non-Provisional application Ser. No. 17/959,169, filed on 3 Oct. 2022 which claims the benefit of U.S. Non-Provisional application Ser. No. 17/357,390, filed on 24 Jun. 20221, which claims the benefit of U.S. Provisional Application No. 63/044,967 filed on 26 Jun. 2020, each of which is incorporated in its entirety by this reference.

Application Ser. No. 17/357,390 also claims the benefit of U.S. Provisional Application No. 63/061,728 filed on 5 Aug. 2020, which is hereby incorporated in its entirety by this reference.

TECHNICAL FIELD

The present invention relates to a solar panel system, particularly a novel solar panel design to increase performance in a cost-effective manner.

BACKGROUND

Solar panel technology has evolved over the last several decades. Solar panels typically include a flat sheet of semiconductor material which absorbs the sun's rays and converts the sun's light and heat to electrical energy. However, conventional solar panels composed of flat sheets are subjected to wind forces that may impact the structural integrity of the panels on a windy day or during a storm. Mounting systems for solar panels exists but are rather expensive to manufacture and install.

Therefore, a need exists for solar panels that are cost effective and structurally configured to withstand wind forces, as well as being easy to install. The present invention addresses this need.

SUMMARY

The present invention relates to a solar panel system, particularly a novel solar panel design to increase performance in a cost-effective manner. The present invention discloses an elongated solar electric module which includes a first transparent material and a second transparent material. A solar electric material may be disposed between the first transparent material and the second transparent material.

The present invention also discloses a solar panel assembly which includes a plurality of elongated solar electric tubes. Each of the elongated solar electric tubes has two or more adjacent planes. Additionally, the solar panel assembly includes a solar electric material comprising one or more arrays of solar electric cells spaced apart and coupled electrically. The solar electric material spans the two or more adjacent planes on inside portions of each elongated solar electric tube.

BRIEF DESCRIPTION OF THE DRAWINGS

To facilitate understanding, identical reference numerals have been used, wherever possible, to designate identical elements that are common to the figures. The drawings are not to scale and the relative dimensions of various elements in the drawings are depicted schematically and not necessarily to scale. The techniques of the present invention may readily be understood by considering the following detailed description in conjunction with the accompanying drawings, in which.

DETAILED DESCRIPTION

Before the present invention is described in detail, it is to be understood that, unless otherwise indicated, this invention is not limited to specific procedures or articles, whether described or not.

It is further to be understood that the terminology used herein is for the purpose of describing particular embodiments only and is not intended to limit the scope of the present invention.

It must be noted that as used herein and in the claims, the singular forms "a," and "the" include plural referents unless the context clearly dictates otherwise.

Where a range of values is provided, it is understood that each intervening value, to the tenth of the unit of the lower limit unless the context clearly dictates otherwise, between the upper and lower limit of that range, and any other stated or intervening value in that stated range, is encompassed within the invention. The upper and lower limits of these smaller ranges may independently be included in the smaller ranges, and are also encompassed within the disclosure, subject to any specifically excluded limit in the stated range. Where the stated range includes one or both of the limits, ranges excluding either or both of those included limits are also included in the disclosure. The term "about" generally refers to +10% of a stated value.

The present invention relates to a solar panel system, particularly a novel solar panel design to increase performance in a cost-effective manner. The present invention discloses an elongated solar electric module which includes a first transparent material and a second transparent material. The elongated solar electric module also includes a solar electric material disposed between the first transparent material and the second transparent material.

The solar panel system disclosed in the present invention is cost-effective as the material components of the solar electric module are readily abundant-transparent materials, solar cells, adhesives, and other commoditized materials. Furthermore, the present disclosure provides several embodiments of solar electric modules of lesser weight than conventional solar electric modules thereby facilitating easier installation.

In some implementations, the solar panel systems disclosed herein employs bi-facial solar cells to catch light directly from the sun and also light reflected from a surface (e.g., of a roof directly under the solar panel systems).

Figure 1:
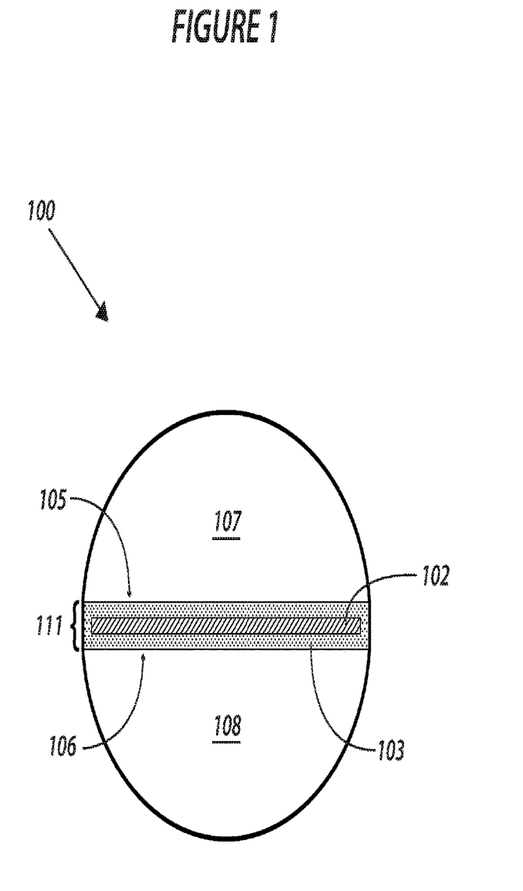
FIG. 1 is across-sectional view of a solar electric module embodiment consistent with the present invention.

FIG. 1 is across-sectional view of a solar electric module 100 embodiment consistent with the present invention. A plurality of solar electric modules 10 may be installed within a solar panel. Although FIG. 1 shows across-sectional view of a solar electric module 100, those having ordinary skill in the art may appreciate that solar electric module 10 has a tubular shape (e.g., elongated) and therefore its length is greater than its width.

A solar panel consistent with the present invention may include an elongated array of one or more solar electric modules. Likewise, each solar electric module may include an elongated array of solar electric cells spaced apart but coupled to each other electrically. In some implementations, each array of solar electric cells include bi-facial photovoltaic materials (e.g., solar cell).

Although FIG. 1 depicts that the cross-sectional view of solar electric module 100 is circularly-shaped, the present invention is not limited thereto. Solar electric module 100 may have any suitable cross-sectional shape so long as the performance of the solar electric module 100 is uninhibited.

In some embodiments, each solar electric module is spaced apart a distance that is at least one quarter the width of each elongated solar electric module. Further, the cross section of each solar electric module may be a square shape, triangular shape, elliptical shape, or circular shape. It should be known, however, that the present invention is not limited to these shapes but are representative and exemplary of embodiments of the present invention.

Solar electric module 100 absorbs solar light and converts said absorbed light into electrical energy. The converted electrical energy may be routed from the solar electric module 100 device. In the embodiment shown, the shape of first and second transparent materials 107, 108 are intended to cause more sunlight to reach the solar electric material 102.

First and second transparent material 107, 108 may have a cross-sectional thickness in the range of 5-15 mm. For example, in one embodiment, the cross-sectional thickness of each transparent material 107, 108 is approximately 10 mm.

Between first and second transparent material 107, 108 lies a solar electric material. In various embodiments throughout this disclosure, solar electric material 102 is a photovoltaic material 102. For example, photovoltaic material 102 may comprise monocrystalline silicon, polycrystalline silicon, amorphous silicon, cadmium telluride, or copper indium gallium selenide/sulfide. Photovoltaic material 102 absorbs incident solar light and converts the light energy into electrical energy.

In one or more embodiments of the present invention, photovoltaic material 102 is embedded in adhesive material layer 103. As shown in the figure, the top surface 105 of adhesive material 103 is incident to the bottom surface of first transparent material 107. Furthermore, the bottom surface 106 of adhesive material 103 is incident to the top surface of second transparent material 108.

Figure 2:
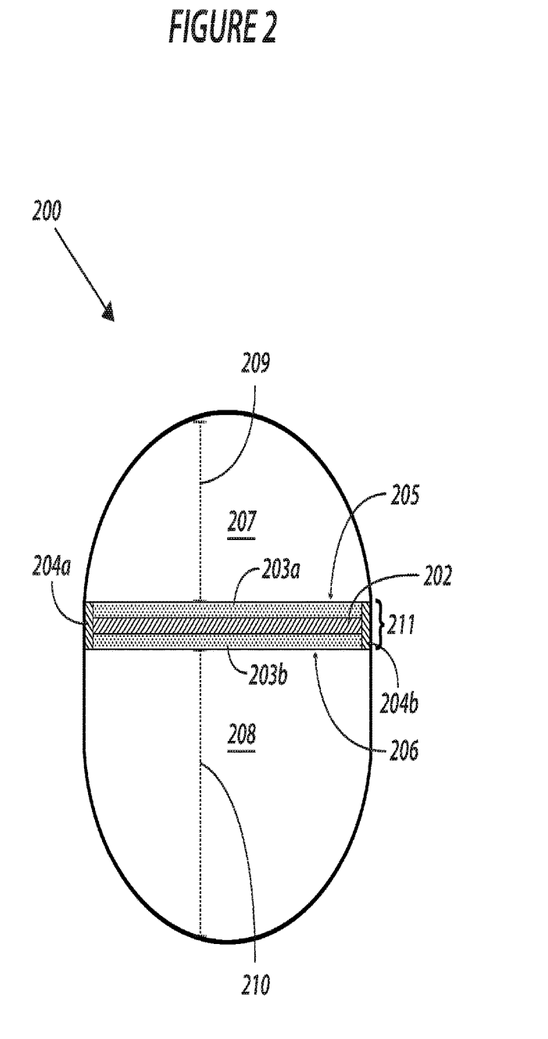
FIG. 2 is a cross-sectional view of another solar electric module embodiment consistent with the present invention which has an asymmetric transparent material thickness.

In this disclosure, the materials (e.g., photovoltaic material 102 and adhesive material 103) between first transparent material 107 and second transparent material 108 may be collectively referred to as a stack 1 of materials. FIG. 2 is across-sectional view of another solar electric module 200 embodiment consistent with the present invention which has an asymmetric transparent material thickness. Solar electric module 200 is similar to the solar electric module shown in FIG. 1 as solar electric module 200 includes a stack 21 of materials between the first and second transparent materials 207, 208.

Stack 211 includes a photovoltaic material 202 disposed between adhesive materials 203a, 203b. Stack 21 also includes lateral material layers 204a, 204b on the sides of photovoltaic material 202 and adhesive materials 203a, 203b. Lateral material layers 204a, 204b may be electrically resistive to electrically isolate photovoltaic material 202 within the solar electric module 200. Lateral material layers 204a, 204b may comprise silicone, butyl rubber, or any other suitable material known in the art.

In some embodiments, the top surface 205 of adhesive material layer 203a is incident to first transparent material 207 whereas the bottom surface 206 of adhesive material layer 203b is incident to second transparent material 208. In some embodiments, lateral material layers 204a, 204b may have adhesive properties as well.

Notably, the area of first transparent material 207 is less than the area of second transparent material 208. As shown, the cross-sectional thickness 209 of first transparent material 207 is less than the cross-sectional thickness 210 of second transparent material 208. In some embodiments, cross-sectional thicknesses 209, 210 of the first and second transparent materials 207, 208, respectfully, may range from 5-15 mm. For example, cross-sectional thickness 209 of first transparent material 207 may be 8 mm whereas the cross-sectional thickness 210 of second transparent material 208 may be approximately 10 mm.

Figure 3:
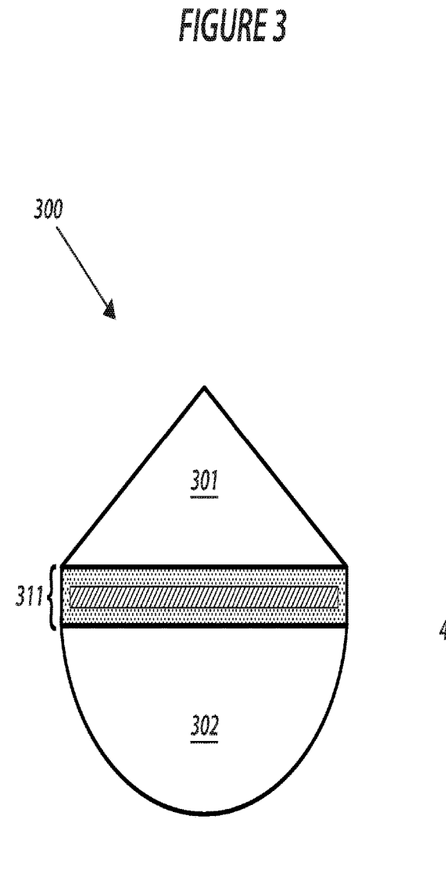
FIG. 3 is a cross-sectional view of another representative embodiment of a solar electric module consistent with the present invention which has a unique shape for a first transparent material and a second transparent material.

FIG. 3 is a cross-sectional view of another representative embodiment of a solar electric module 300 consistent with the present invention which has a unique shape for a first transparent material 301 and a second transparent material 302. Solar electric module 300 has a stack 31 of material layers between first and second transparent materials 301, 302.

In the figure, first transparent material 301 has a triangular shape whereas second transparent material 302 has a semicircular shape. The different shapes of transparent materials 301, 302 effect various performance attributes and may enable easier or cheaper device manufacturing.

Each transparent material 301, 302 may have an effect on the solar electric material. For example, the round shape of second transparent material 302 may allow wind to flow smoothly there beneath. Accordingly, the overall shape of solar electric module 300 may be aerodynamically suited to provide a stable apparatus that is resistant to wind forces.

Figure 4:
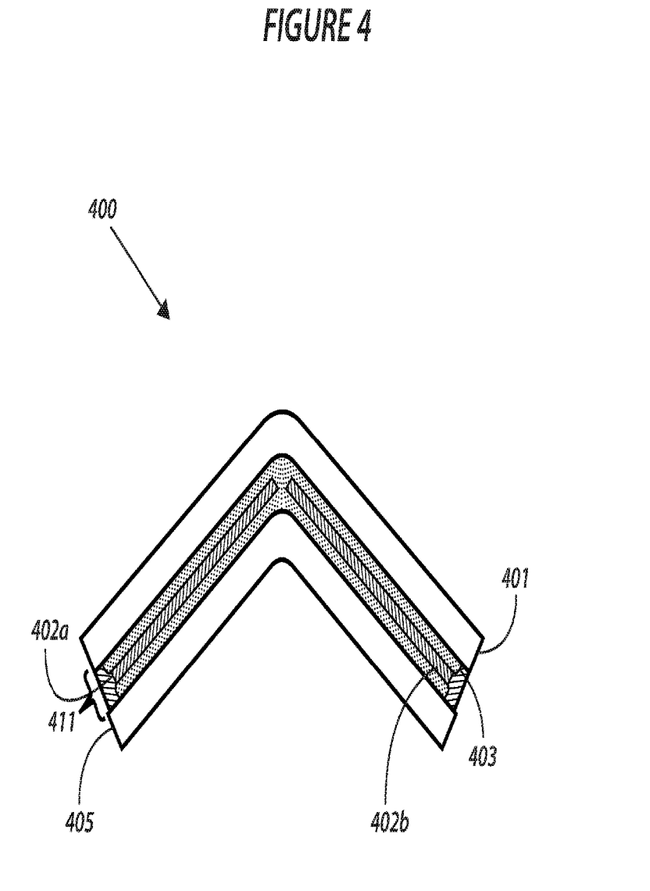
FIG. 4 is a cross-sectional view of another solar electric module embodiment consistent with the present invention which has a non-planar transparent material configuration.

FIG. 4 is a cross-sectional view of another solar electric module 400 embodiment consistent with the present invention which has a non-planar transparent material configuration. Solar electric module 400 includes a stack 411 of material layers disposed between first and second transparent materials 401, 405.

Notably, solar electric module 400 includes disjointed, photovoltaic materials 402a, 402b to facilitate the bend in the first and second transparent materials 401, 405. In the embodiment, the photovoltaic materials 402a, 402b are enmeshed within adhesive material 403. In the embodiment shown, first and second transparent materials 401, 405 each have a bent portion in a central region therein.

Figure 5:
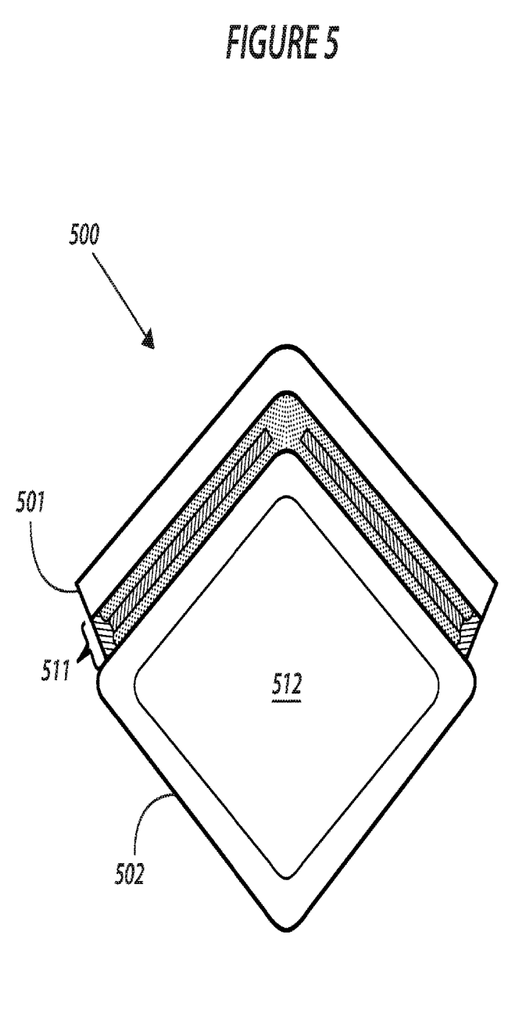
FIG. 5 is another cross-sectional view of another solar electric module embodiment consistent with the present invention which has an asymmetric transparent material configuration.

FIG. 5 is another cross-sectional view of another solar electric module 500 embodiment consistent with the present invention which has an asymmetric transparent material configuration. Solar electric module 500 is similar to the solar electric module shown in the previous figure. Accordingly, solar electric module 500 includes a stack 511 of material layers disposed between first and second transparent materials 501, 502.

Notably, second transparent material 502 has a quadrilateral shape with a hollow portion 512. Hollow portion 512 may provide many benefits to solar electric module 50 and therefore the solar panel which contains these modules.

For example, hollow portion 512 facilitates a cost-effective solar electric module as it may require fewer kilograms of glass than conventional solar electric modules. Therefore, solar panels which incorporate solar electric modules 50 are easier to install as they are lesser in weight. Moreover, the configuration of solar electric module 50 may yield a much stronger assembly than solar electric modules made of conventional planar glass sheets (transparent materials).

Figure 6:
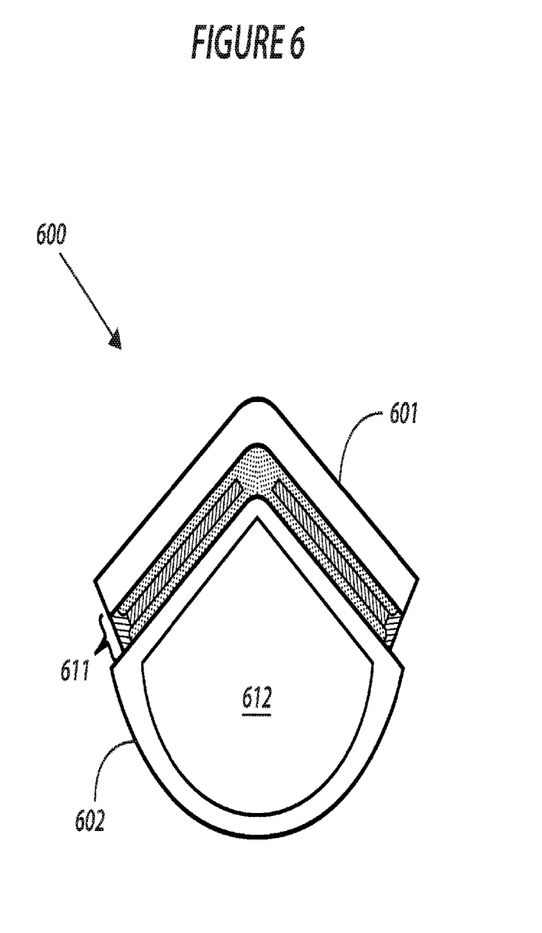
FIG. 6 is a cross-sectional view of another representative embodiment of a solar electric module consistent with the present invention which has an asymmetric transparent material configuration.

FIG. 6 is a cross-sectional view of another representative embodiment of a solar electric module 600 consistent with the present invention which has an asymmetric transparent material configuration. Solar electric module 600 includes a stack 611 of material layers disposed between first and second transparent materials 601, 602.

Notably, first transparent material 601 is similar to the first transparent material in the previous figure. However, second transparent material 602 is shaped such that a first half is triangular but the bottom half is semi-circular. The hollow portion 512 may also yield a stronger assembly than a solar electric module comprising planar transparent sheets.

Figure 7:
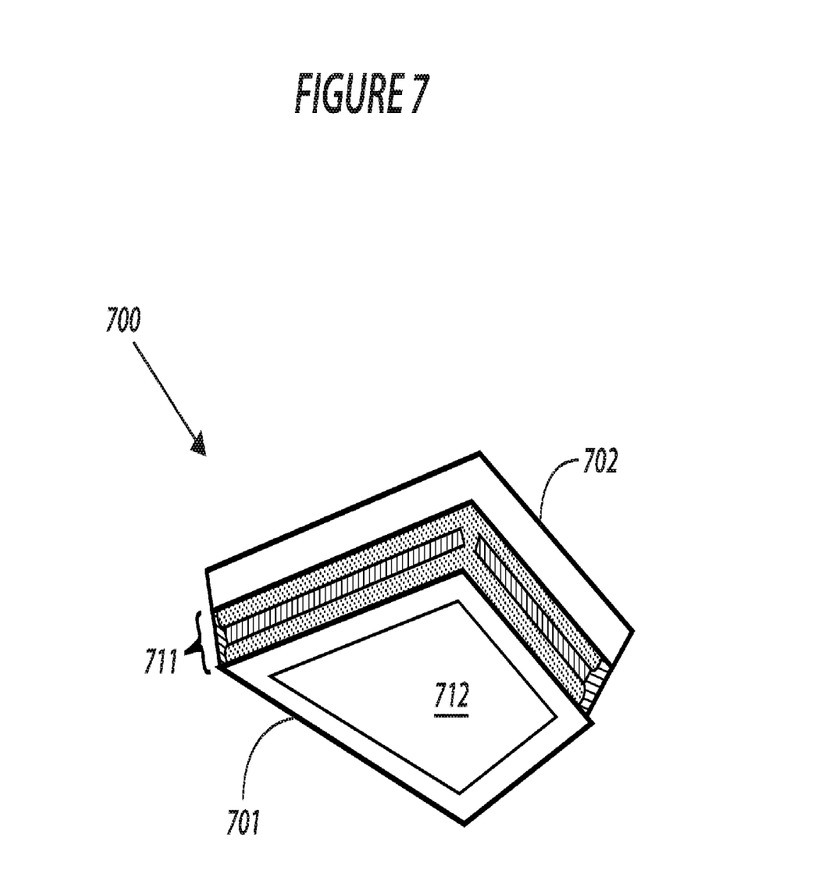
FIG. 7 is a cross-sectional view of another representative embodiment of a solar electric module consistent with the present invention which has an asymmetrical transparent material configuration.

FIG. 7 is a cross-sectional view of another representative embodiment of a solar electric module 700 consistent with the present invention which has an asymmetrical transparent material configuration. The solar electric module 700 includes an asymmetrically-shaped first transparent material 702 and an asymmetrically-shaped second transparent material 701 with a stack 711 of materials (e.g., photovoltaic and adhesion materials) disposed there between. Additionally, as shown, second transparent material 701 has a hollow portion 712 therein.

Figure 8:
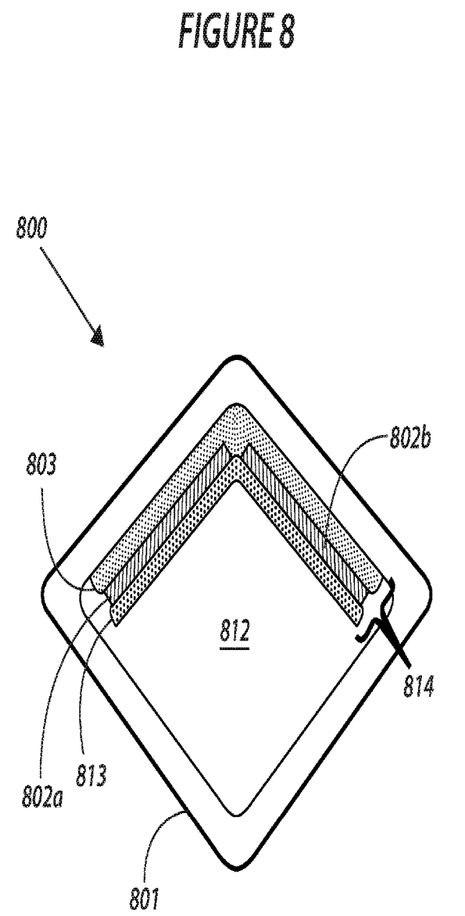
FIG. 8 is a cross-sectional view of another solar electric module embodiment consistent with the present invention which has a single quadrilaterally-shaped transparent material configuration.

FIG. 8 is a cross-sectional view of another solar electric module 800 embodiment consistent with the present invention which has a single quadrilaterally-shaped transparent material configuration. On an inside surface of the transparent material 801 is a stack 814 of materials.

Stack 814 includes adhesive material 803, solar electric materials (e.g., photovoltaic material layers) 802a, 802b, and material layer 813. In some embodiments, photovoltaic material layers 802a, 802b are bi-facial.

The photovoltaic material layers 802a, 802b may be adhered to the transparent material 801 by an adhesive material 803. In some implementations, adhesive material 803 is disposed between an inside portion of transparent material 801 and photovoltaic material layers 802a, 802b. On opposing sides of each photovoltaic material layer 802a, 802b is a material layer 813.

In some embodiments, material layer 813 comprises one or more transparent materials which are designed to reduce the reflection of light that enter the lower side of the photovoltaic material. In some implementations, material layer 813 includes an anti-reflective material.

Material layer 813 may comprise silicone or ethyl vinyl acetate but the present invention is not limited thereto. In some implementations, material layer 813 may be relatively weak mechanically and may have optical properties which allow light to effectively reach the bi-facial solar cells 802a, 802b. Notably, the solar electric module 801 functions well to collect and convert sunlight into electrical energy although the bottom side of solar electric materials 802a, 802b are not adjacent to a transparent material (e.g., the bottom half portion of transparent material 801).

Adhesive material 803 may have a thickness below one millimeter. Material layer 813 may comprise any composition such that when reflected light rays are incident thereto, material layer 813 facilitates their transmission to the photovoltaic material layers 802a, 802b. Transparent material 801 has a hollow portion 812 therein.

Figure 9:
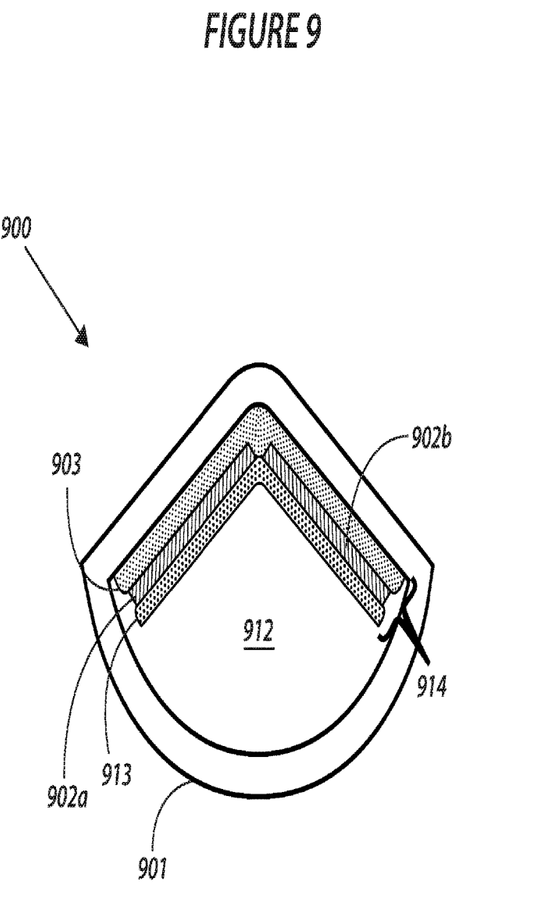
FIG. 9 is across-sectional view of another solar electric module embodiment consistent with the present invention which has a single transparent material configuration.

FIG. 9 is a cross-sectional view of another solar electric module 900 embodiment consistent with the present invention which has a single transparent material configuration Solar electric module 900 has bi-facial photovoltaic material layers 902a, 902b disposed upon and adhered to (e.g., via adhesive material 903) an inside surface of the transparent material 901. Adhesive material 903 may have a thickness below one millimeter. Transparent material 901 includes a hollow portion 912 therein. In some implementations, material layer 913 includes an anti-reflective material.

In some implementations, material layer 913 may be relatively weak mechanically and may have optical properties which allow light to effectively reach the bi-facial solar cells 902a, 902b. Notably, the solar electric module 901 functions well to collect and convert sunlight into electrical energy although the bottom side of solar electric materials 902a, 902b are not adjacent to a transparent material (e.g., the bottom half portion of transparent material 901).

Figure 10A:
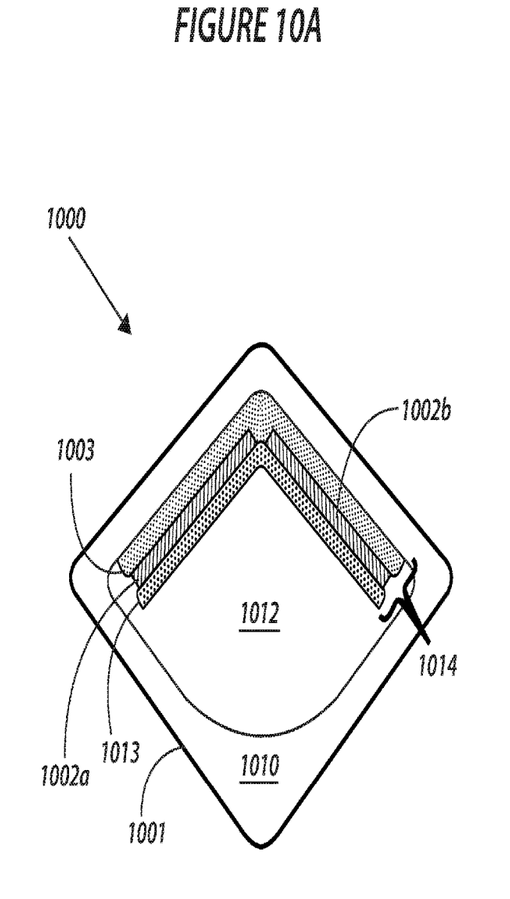
FIG. 10A is a cross-sectional view of another solar electric module having a varying thickness along a single quadrilaterally-shaped transparent material.

FIG. 10A is a cross-sectional view of another solar electric module 1000 having a varying thickness along a single quadrilaterally-shaped transparent material. Solar electric module 1000 features a single outer transparent material 1001 with stacks of adhesive-solar cell-adhesive layers 1003/1002a/1003, 1003/1002b/1003 therein.

In addition, solar electric module 10 includes a hollow portion 1012 therein. Adhesive material 1003 may have a thickness below one millimeter. In some implementations, material layer 1013 includes an anti-reflective material.

As shown, the variation in thickness is noted by section 1010 at the bottom of transparent material 1001. Notably, below the hollow portion 1012 near one end of the transparent material 1001 is a thicker portion 1011 of transparent material 1001.

The thicker portion 1011 of transparent material 1001 may increase the amount of reflected light that reaches the photovoltaic material layers 1003a, 1003b as the index of refraction of the transparent material 1001 causes the reflected light to bend inside of the transparent material 1001 preferably towards the photovoltaic material layers 1003a, 1003b.

In some implementations, material layer 1013 may be relatively weak mechanically and may have optical properties which allow light to effectively reach the bi-facial solar cells 1002a, 1002b. Notably, the solar electric module 101 functions well to collect and convert sunlight into electrical energy although the bottom side of solar electric materials 1002a, 1002b are not adjacent to a transparent material (e.g., the bottom half portion of transparent material 1001).

Figure 10B:
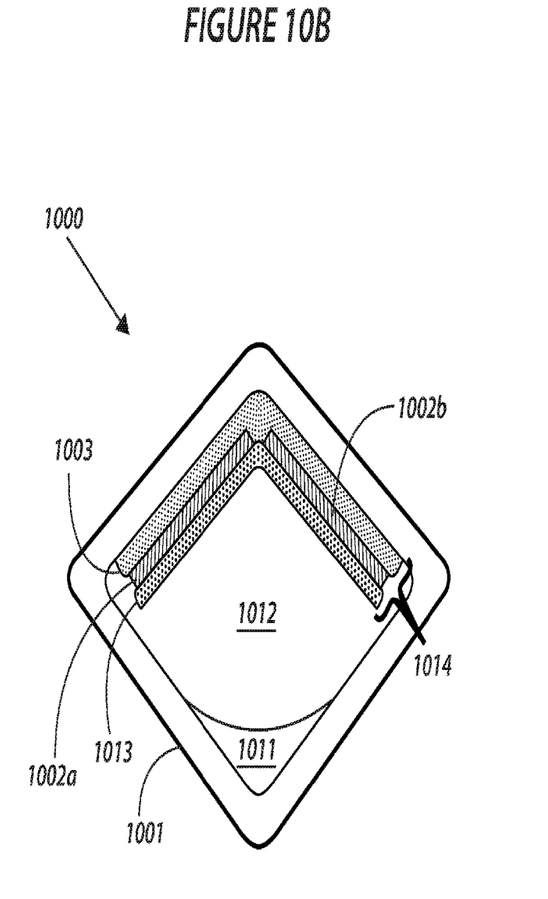
FIG. 10B is a cross-sectional view of solar electric module having a varying thickness along a single quadrilaterally-shaped transparent material having an extra transparent layer on a bottom region.

FIG. 10B is a cross-sectional view of solar electric module 1000 having a varying thickness along a single quadrilaterally-shaped transparent material having an extra transparent layer on a bottom region. As shown, solar electric module 1000 features a single outer transparent material 1001 with stacks of adhesive-solar cell-adhesive layers 1003/1002a/1003, 1003/1002b/1003 therein. Notably, the variation in thickness may be accomplished by adding a second transparent material.

In some embodiments, material layer 1011 comprises a transparent material which may be formed by solidifying a liquid transparent material at one end of the transparent material 1001 (below the hollow portion). Advantageously, material layer 1010 may increase the amount of reflected light that reaches the photovoltaic material layers 1002a, 1002b as the index of refraction of the transparent material (e.g., >1) causes the reflected light to bend inside of the transparent material 1001 preferably towards the photovoltaic material layers 1002a, 1002b. In some embodiments, material layer 1011 has the same index of refraction as transparent material 1001.

Figure 11:
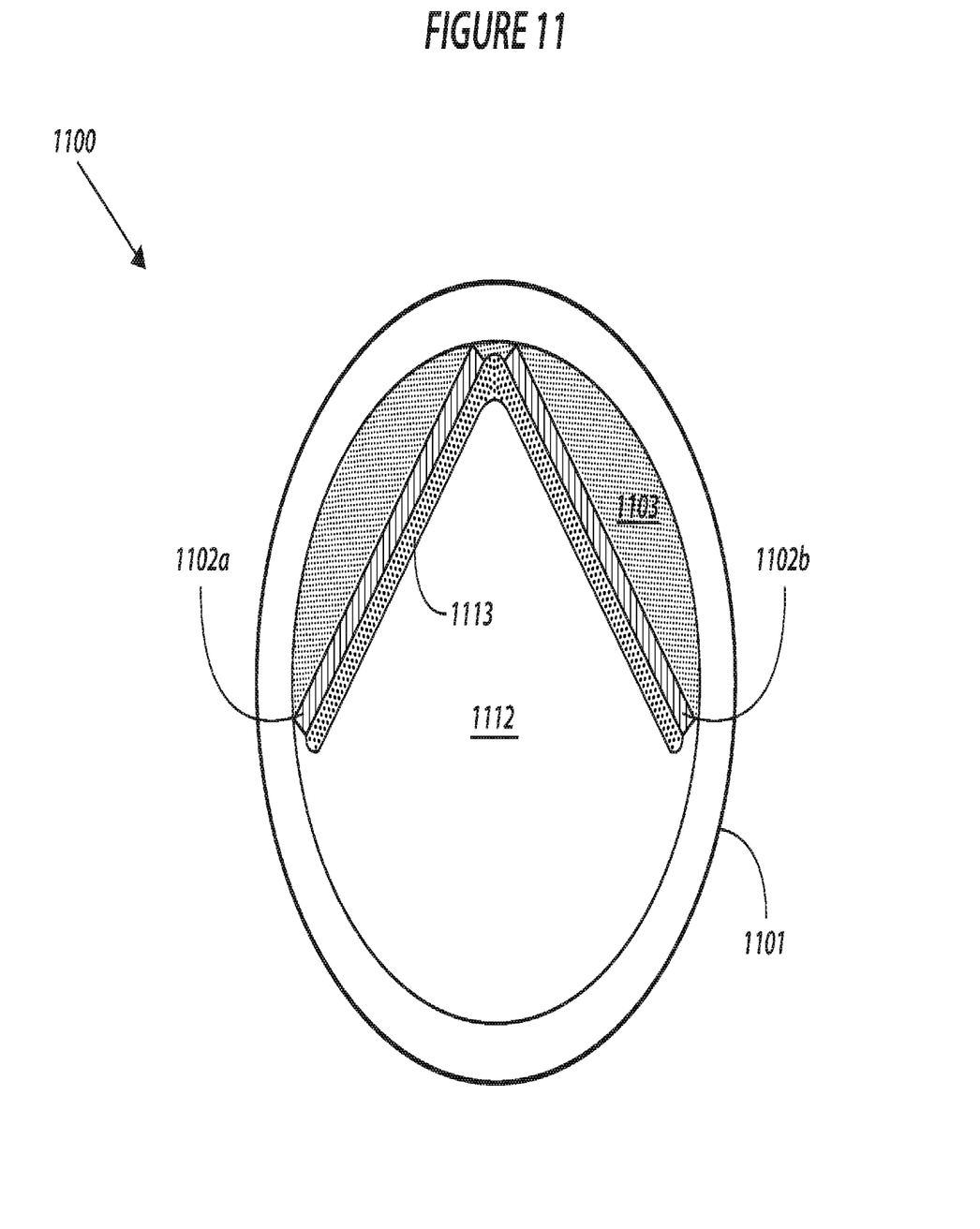
FIG. 11 is a cross-sectional view of another solar electric module embodiment consistent with the present invention which has a circularly-shaped transparent material with a solar electric material therein.

FIG. 11 is a cross-sectional view of another solar electric module 1100 embodiment consistent with the present invention which has a circularly-shaped transparent material with a solar electric material therein. The solar electric module 1100 shown in the figure depicts a circular transparent material 1101 (with a hollow portion 1112) within which solar electric materials 1102a, 1102b are disposed upon an internal wall of the transparent material 1101. Implementation of solar electric module 1100 may be advantageous as solar electric modules with a circular shape may be relatively cheap to manufacture. Additionally, the circular transparent materials are plentiful in the marketplace thereby reducing costs.

Solar electric materials 1102a, 1102b may adhere to an inside wall of the transparent material 1101 via regions of adhesive material 1103. Further, material layer 1113 may be disposed on a backside of the solar electric materials 1102a, 1102b according to choice and design. In some implementations, material layer 1113 includes an anti-reflective material.

Figures 12A, 12B:
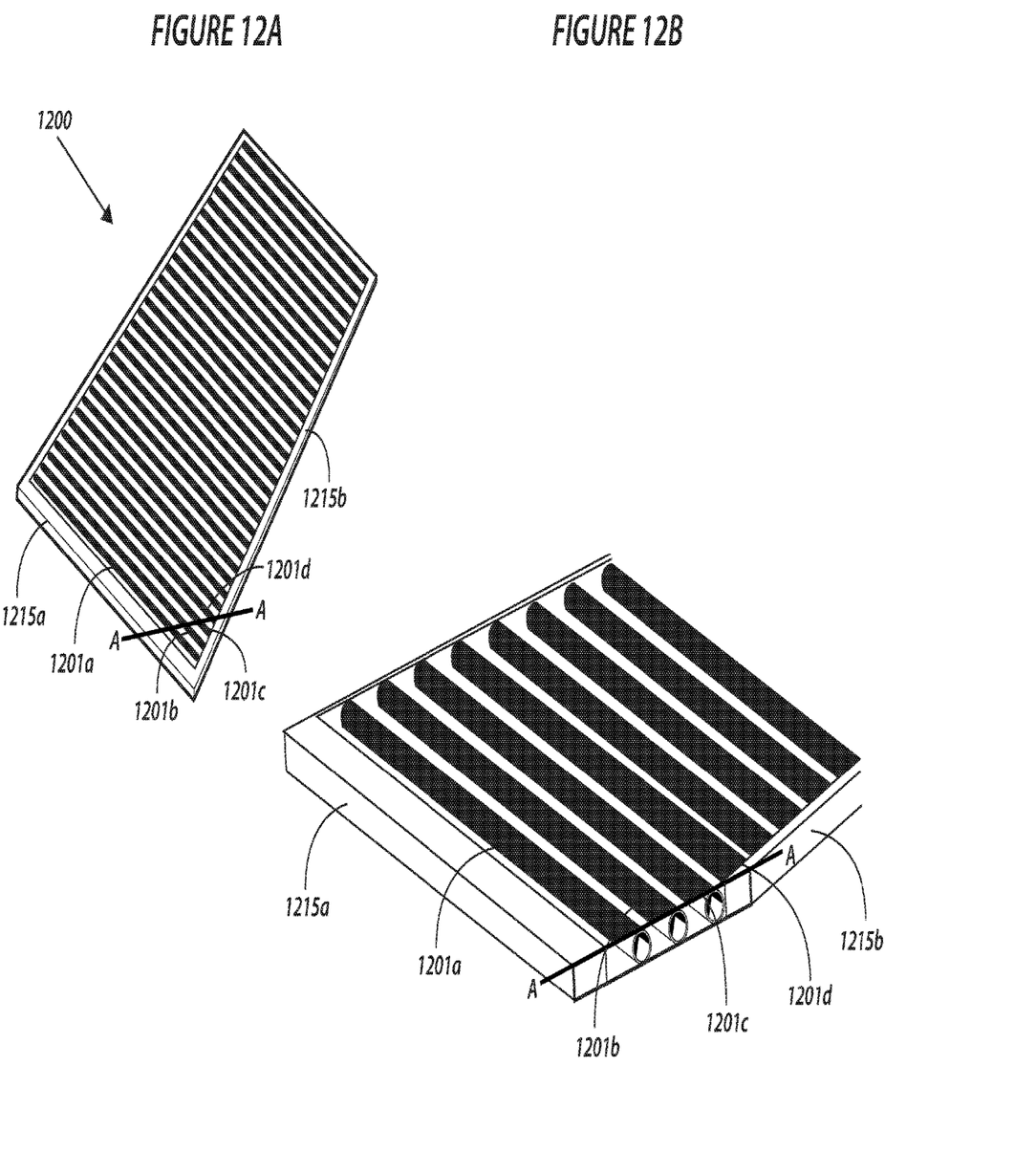
FIG. 12A is a perspective view of a solar panel having a plurality of solar electric modules.
FIG. 12B is across-sectional view of the solar panel about line A-A.

FIG. 12A is a perspective view of a solar panel 1200 having a plurality of solar electric modules 1201. Notably, solar electric modules 1201 span the width of the solar panel. The solar electric modules may be spaced apart by any suitable distance such that the solar panel 1200 is structurally compatible to withstand strong winds and provide enough photovoltaic material to absorb sunlight energy.

FIG. 12B is a cross-sectional view of the solar panel 1200 about line A-A. In particular, about line A-A, the cross-sections of solar electric modules 1201a-1201d are exposed. In addition, the frame ends 1215a, 1215b are depicted to illustrate the solar electric modules 1201a-1201d along line A-A.

Notably, the cross-section of solar electric modules 1201 is consistent with the solar electric modules in FIG. 1. However, the present invention is not limited thereto as the solar electric modules 1201 of solar panel 1200 may be any of the representative embodiments discussed within this disclosure. In some implementations, solar panel 1200 may consist of a hybrid of solar electric modules such that their cross-sections may differ from one solar electric module to another.

The preceding Description and accompanying Drawings describe examples of embodiments in some detail to aid understanding. However, the scope of protection may also include equivalents, permutations, and combinations that are not explicitly described herein. Only the claims appended here (along with those of parent, child, or divisional patents, if any) define the limits of the protected intellectual-property rights.

I claim:

1. A solar electric panel system comprising:
   an elongated solar electric tube arranged within a single panel and comprising:
   a glass housing defining a tubular geometry and a round cross-section;
   a first row of bi-facial solar cells:
   arranged within a hollow interior of the glass housing;
   defining a first front side facing outwardly from a center of the glass housing; and
   defining a first rear side facing inwardly toward the center of the glass housing; and
   a second row of bi-facial solar cells:
   arranged within the hollow interior of the glass housing;
   offset from the first row of bi-facial solar cells;
   defining a second front side facing outwardly from the center of the glass housing; and
   defining a second rear side facing inwardly toward the center of the glass housing; and
   an adhesive configured to:
   adhere the first row of bi-facial solar cells and the second row of bi-facial solar cells to an interior surface of the glass housing; and
   direct light:
   to the first front side of the first row of bi-facial solar cells; and
   to the second front side of the second row of bi-facial solar cells.

2. The solar electric panel system of claim 1:
   wherein the first row of bi-facial solar cells:
   are arranged within an upper half of the round cross-section of the glass housing;
   wherein the glass tube:
   directs light entering the upper half of the glass housing to the first front side of the first row of bi-facial solar cells; and
   directs light entering a lower half of the glass housing to the first rear side of the first row of bi-facial solar cells; and wherein the second row of bi-facial solar cells:
are arranged within the upper half of the round cross-section of the glass housing; and
wherein the glass tube:
directs light entering the upper half of the glass housing to the second front side of the second row of bi-facial solar cells; and
directs light entering a lower half of the glass housing to the second rear side of the second row of bi-facial solar cells.

3. The solar electric panel system of claim 1:
wherein the first row of bi-facial solar cells defines a first lateral face arranged between the first front side and the first rear side;
wherein the second row of bi-facial solar cells defines a second lateral face arranged between the second front side and the second rear side;
wherein the adhesive:
is arranged interposed between the first lateral face and the second lateral face to maintain a separation between the first row of bi-facial solar cells and the second row of bi-facial solar cells;
further comprising a material layer:
spanning the first row of bi-facial solar cells, the second row of bi-facial solar cells, and the separation between the first row of bi-facial solar cells and the second row of bi-facial solar cells.

4. The solar electric panel system of claim 3:
wherein the first rear side of first row of bi-facial solar cells and the second rear side of the second row of bi-facial solar cells form an acute angle.

5. The solar electric panel system of claim 3:
wherein the material layer isolates the first row of bi-facial solar cells from the second row of bi-facial solar cells.

6. The solar electric panel system of claim 1:
further comprising a material layer:
spanning the first plane, the second plane, and the gap;
abutting the first rear side of the first row of bi-facial solar cells and the second rear side of the second row of bi-facial solar cells;
configured to seal the first row of bi-facial solar cells and the second row of bi-facial solar cells from the hollow interior of the glass housing; and
comprising an anti-reflective material configured to:
reduce reflection of light away from the first rear side of the first row of bi-facial solar cells and the second rear side of the second row of bi-facial solar cells; and
direct light incident on the material layer toward the first rear side of the first row of bi-facial solar cells and the second rear side of the second row of bi-facial solar cells.

7. The solar electric panel system of claim 1:
wherein the first row of bi-facial solar cells further comprises a lateral edge connecting the first front side to the first rear side; and
further comprising a lateral material layer:
arranged on the lateral edge of the first row of bi-facial solar cells; and
configured to isolate the lateral edge from the glass housing.

8. The solar electric panel system of claim 1:
wherein the glass housing comprises a region of variable thickness defining a parabolic geometry configured to focus light incident on the lower half of the glass housing toward the first rear side of the first row of bi-facial solar cells and the second rear side of the second row of bi-facial solar cells.

9. The solar electric panel system of claim 1:
wherein the glass housing exhibits a first refractive index;
wherein a region of variable thickness of the glass housing comprises a material deposited within the hollow interior of the glass housing exhibiting a second refractive index different than the first refractive index; and
wherein the glass housing and the material deposited in region of variable thickness cooperate to direct light over a range of incident angles on an exterior surface of the glass housing toward the first rear side of the first row of bi-facial solar cells and the second rear side of the second row of bi-facial solar cells.

10. The solar electric panel system of claim 1, further comprising a reflective element:
arranged in the glass tube about a region of variable thickness of the glass housing; and
arranged opposite the first rear side of the first row of bi-facial solar cells and the second rear side of the second row of bi-facial solar cells.

11. The solar electric panel system of claim 10:
wherein the reflective element defines a parabolic cross-section:
arranged coplanar with the round cross-section of the glass housing; and
configured to reflect a portion of light incident upon the reflective element toward the first rear side of the first row of bi-facial solar cells and the second rear side of the second row of bi-facial solar cells.

12. The solar electric panel system of claim 10:
wherein the reflective element removably adheres to an outer surface of the glass housing.

13. The solar electric panel system of claim 1, wherein the adhesive is further configured to:
occupy a portion of the hollow interior of the glass housing to adhere the first row of bi-facial solar cells and the second row of bi-facial solar cells to the interior surface of the glass housing;
reduce reflection of light that enters the upper half of the glass housing; and
isolate the first front side of the first row of bi-facial solar cells and the second front side of the second row of bi-facial solar cells from the glass housing.

14. The solar electric panel system of claim 1, wherein the elongated solar electric tube further comprises:
a first cap:
arranged at a first end of the glass housing;
configured to seal the first end of the glass housing; and
electrically coupling the first row of bi-facial solar cells and the second row of bi-facial solar cells to a first cable; and
a second cap:
arranged at a second end of the glass housing opposite the first end;
configured to seal the second end of the glass housing; and
electrically coupling the first row of bi-facial solar cells and the second row of bi-facial solar cells to a second cable.

15. The solar electric panel system of claim 14:
wherein the first cap defines a first connector to the first cable, the first connector arranged at a first exterior apex of the first end of the glass housing; and
wherein the second cap defines a second connector to the second cable, the second connector arrange at a second exterior apex of the second end of the glass housing and aligned with the first connector.

16. The solar electric panel system of claim 15:
wherein the first connector defines a first cable bore:
  oriented perpendicularly to the glass housing; and
  configured to receive the first cable.

17. The solar electric panel system of claim 15:
wherein the first cable supports the first end of the glass housing via the first cap;
wherein the second cable supports the second end of the glass housing via the second cap; and
wherein the elongated solar electric tube is arranged:
  perpendicular to the first cable and the second cable; and
  hanging below the first cable and the second cable.

18. A solar electric panel system comprising:
a first cable;
a second cable; and
a set of an elongated solar electric tubes, each elongated solar electric tube in the set of elongated solar electric tubes comprising:
  a glass housing defining a tubular geometry and a round cross-section;
  a first row of bi-facial solar cells:
    arranged within a hollow interior of the glass housing;
    defining a first front side facing outwardly from a center of the glass housing; and
    defining a first rear side facing inwardly toward the center of the glass housing; and
  a second row of bi-facial solar cells:
    arranged within the hollow interior of the glass housing;
    offset from the first row of bi-facial solar cells;
    defining a second front side facing outwardly from the center of the glass housing; and
    defining a second rear side facing inwardly toward the center of the glass housing; and
  an adhesive configured to:
    adhere the first row of bi-facial solar cells and the second row of bi-facial solar cells to an interior surface of the glass housing; and
    direct light:
      to the first front side of the first row of bi-facial solar cells; and
      to the second front side of the second row of bi-facial solar cells.

19. A solar electric panel system comprising:
a first cable;
a second cable; and
a set of an elongated solar electric tubes, each elongated solar electric tube in the set of elongated solar electric tubes comprising:
  a tubular housing;
  a first row of bi-facial solar cells:
    arranged within a hollow interior of the tubular housing;
    defining a first front side facing outwardly from a center of the tubular housing; and
    defining a first rear side facing inwardly toward the center of the tubular housing; and
  a second row of bi-facial solar cells:
    arranged within the hollow interior of the tubular housing;
    offset from the first row of bi-facial solar cells;
    defining a second front side facing outwardly from the center of the tubular housing; and
    defining a second rear side facing inwardly toward the center of the tubular housing; and
  an adhesive configured to:
    adhere the first row of bi-facial solar cells and the second row of bi-facial solar cells to an interior surface of the tubular housing; and
    direct light:
      to the first front side of the first row bi-facial solar cells; and
      to the second front side of the second row of bi-facial solar cells.

* * * * *